United States Patent [19]

Abbott

[11] 4,391,296

[45] Jul. 5, 1983

[54] BY-PASS PILOT OPERATED HYDRAULIC CHECK VALVE

[76] Inventor: John D. Abbott, 26395 S. Corral Hollow Rd., Tracy, Calif. 95395

[21] Appl. No.: 261,458

[22] Filed: May 7, 1981
(Under 37 CFR 1.47)

[51] Int. Cl.³ .................... F16K 17/32; F16K 31/06
[52] U.S. Cl. ................................. 137/523; 137/522; 251/14; 251/130
[58] Field of Search ............... 251/14, 130; 137/522, 137/523

[56] References Cited

U.S. PATENT DOCUMENTS

| | | | |
|---|---|---|---|
| 2,287,936 | 6/1942 | Hose | 137/522 X |
| 2,366,006 | 12/1944 | Culver | 251/130 |
| 2,750,961 | 6/1956 | Uritis | 137/625.5 |
| 2,890,715 | 6/1959 | Ebersold | 137/522 X |
| 2,905,432 | 9/1959 | Mercier | 251/63 |
| 3,357,676 | 12/1967 | Boonshaft | 251/30 |
| 3,421,546 | 1/1969 | Jennings et al. | 137/523 |
| 3,631,887 | 1/1972 | Schlechtreim | 137/522 |
| 4,067,348 | 1/1978 | Davis | 137/87 |

Primary Examiner—Arnold Rosenthal
Attorney, Agent, or Firm—Robert R. Tipton

[57] ABSTRACT

An electriclly actuated, spring biased closed solenoid valve comprising a valve actuating coil, a valve bias spring, a valve plug and a valve seat is adapted to be mechanically actuated by an hydraulic actuated piston actuated by hydraulic fluid in a second fluid channel and having means for cushioning release of the piston from the solenoid valve to prevent hydraulic hammer when the solenoid valve plug stops the flow fluid in the main fluid flow channel. The solenoid valve is also adapted to open under hydraulic back-pressure against the valve seat when the back-pressure exceeds the pressure of the normally closed spring bias.

4 Claims, 2 Drawing Figures

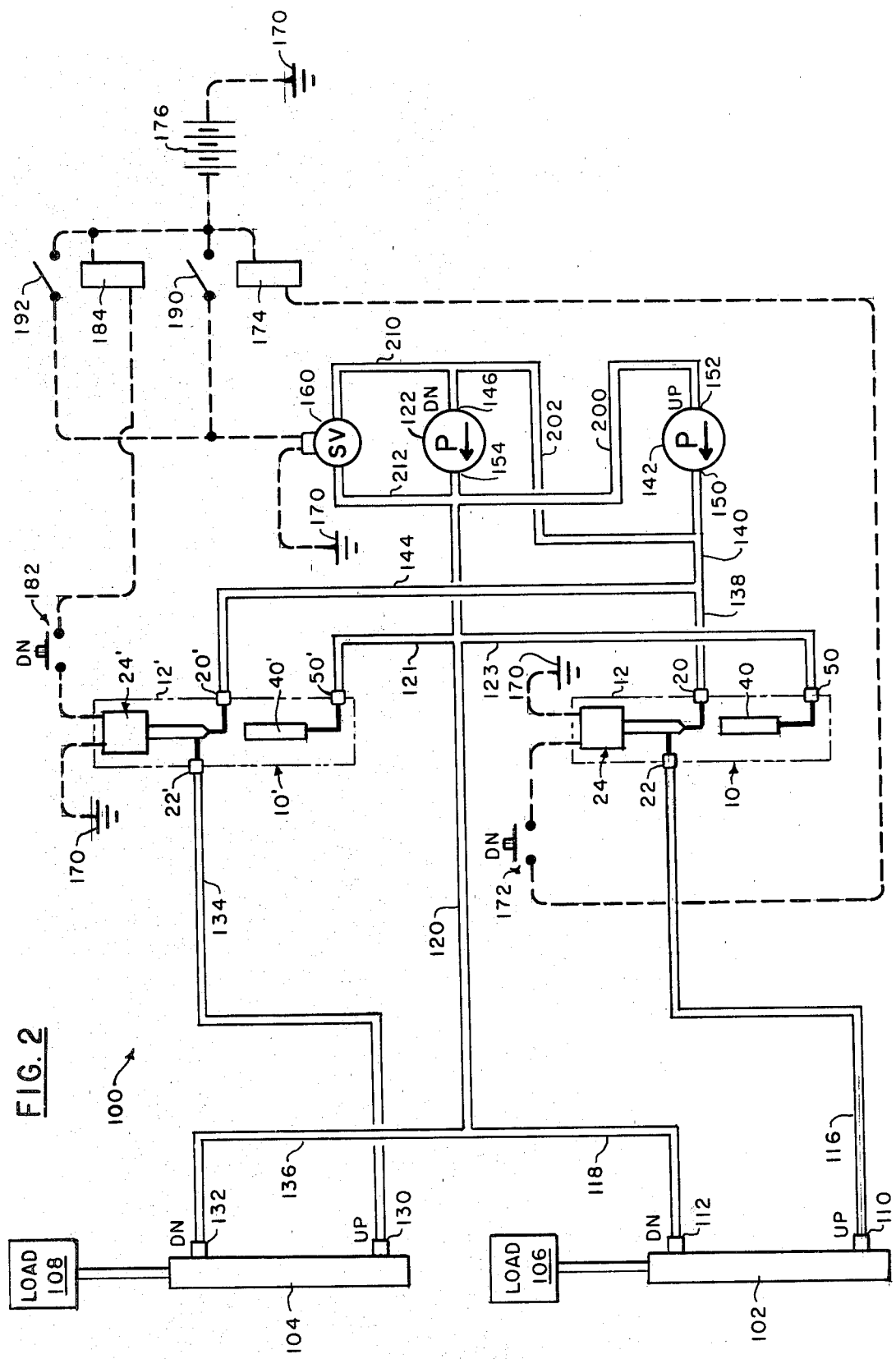

BY-PASS PILOT OPERATED HYDRAULIC CHECK VALVE

BACKGROUND OF THE PRIOR ART

This invention relates generally to solenoid valves for controlling the flow of fluid through a main fluid flow channel and, in particular, to a solenoid valve system in which the solenoid valve can be by-passed utilizing auxiliary means.

Various valves of the prior art have, from time to time, utilized hydraulically operated means to overide a solenoid valve function, however, such valves were highly complex and performed rather complex hydraulic functions, such as, a high speed valve to actuate mechanisms in computing equipment or to act as a pressure control pilot valve or to manually overide an hydraulically operated valve in a fuel supply system.

In general, none of these valves were concerned with overide devices that would be simple in operation and avoid hydraulic fluid hammer when the overide mechanism caused the valve to close.

SUMMARY OF THE INVENTION

The by-pass valve of the present invention comprises, basically, a housing having a main bore with a first and second end, with an inlet port and an outlet port located proximate the first end of the main bore and with the flow of fluid controlled by a solenoid valve having its valve portion disposed between the inlet port and outlet port in the first end of the bore and adapted to control the flow of fluid between the inlet port and the outlet port. A piston is disposed in the bore between the first and second ends and biased away from the first end of the bore. A means for applying hydraulic fluid pressure to the piston is provided to move it toward the solenoid valve and overide the operation of the solenoid valve. A means is attached to the piston for cushioning or delaying the movement of the piston away from the solenoid valve to prevent sudden closure of the solenoid valve upon release of the hydraulic pressure from the piston in the main bore.

It is, therefore, an object of the present invention to provide a valve for the control the flow of fluid both electrically and alternatively by hydraulic pressure.

It is a further object of the present invention to provide a valve for the control of flow of a fluid utilizing an electrically actuated solenoid valve which is also mechanicallay actuated by a piston under hydraulic pressure.

It is still a further object of the present invention to provide a valve for controlling the flow of fluid in which the closure of the valve is slowed to prevent hydraulic fluid hammer.

It is still another object of the present invention to provide a valve for the control of flow of fluid in which an hydraulically controlled override piston is hydraulic decellerated during closure of the main valve mechanism.

These and other objects of the present invention will become manifest upon careful study of the following detailed description when taken together with the drawings.

BRIEF DESCRIPTION OF THE DRAWINGS

FIG. 2 is an hydraulic and electrical circuit diagram illustrating a typical use of the valve of the present invention.

DESCRIPTION OF THE PREFERRED EMBODIMENT

Figure 1:
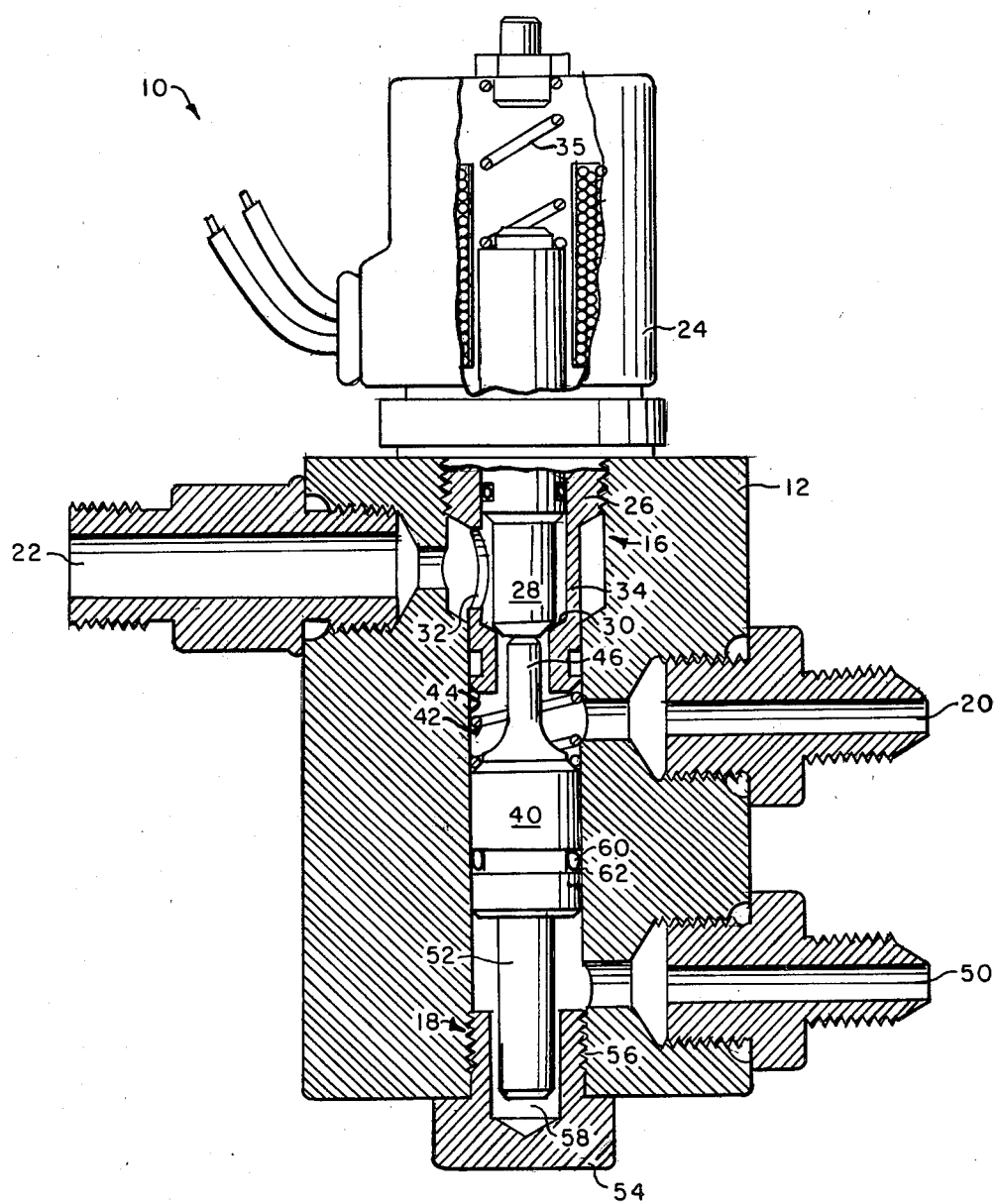
FIG. 1 is an elevational cut-away view of the by-pass valve of the present invention.

With reference to FIG. 1, there is illustrated a cross-sectional, elevational view of the by-pass pilot operated check valve 10 of the present invention.

The valve comprises, basically, a housing 12 having a main bore 14 therein and having an upper or first end 16 at the upper portion thereof and a lower or second end 18 at the lower portion thereof. Proximate the first or upper end 16 of main bore 14 is an inlet port 20 in fluid communication with main bore 14, and an outlet port 22 also in fluid communication with bore 14 proximate first or upper end 16.

Connected to main bore 14 at first end 16 is solenoid valve 24 comprising a threaded neck portion 26 adapted to engage the threads at first end 16 of main bore 14, a valve plug 28 adapted to engage a valve seat 30 intergral with solenoid valve 24. Ports 32 in solenoid valve seat bracket 34 are adapted to prevent the flow of fluid out of valve seat bracket 34 after passing by plug 28 and seat 30. A spring 35 is adapted to bias solenoid valve 24 in the closed position.

It will be noted that, in the view shown, solenoid valve 24 is unenergized and, therefore, in the normally closed position with valve plug 28 in engagement with valve seat 30 to prevent the flow of fluid between inlet port 20 and outlet port 22.

The main fluid flow channel is, therefore, defined as the flow between inlet port 20, through the upper or first end 16 of bore 14 and out through outlet port 22.

Also disposed in bore 14 between ends 16 and 18 is override piston 40 adapted to slidably move in bore 14 toward and away from valve plug 28, however, biased away from first end 16 by helical spring member 42. A valve actuating member 44 is formed at the end of piston 40 facing first end 16 of bore 14 and comprises a cylindrical portion 46 having a diameter less that diameter of piston 40 and also less than the inside diameter of the opening for seat bracket 34 to permit the flow of fluid thereby.

Cylindrical portion 46 can also comprise a roll pin (not shown) which can "float" or remain free to move between piston 40 and valve plug 28. The roll pin, like cylindrical portion 46, must have an outside diameter less than the inside diameter of the opening for seat bracket 34 to permit the flow of fluid thereby.

Proximate the second end 18 of main bore 14 is located second fluid channel 50 also in fluid communication with main bore 14 proximate second end 18. Depending from the end of piston 40 facing second end 18 of bore 14, is piston cushion guide 52 extending along the length of main bore 14 towards second end 18. A fixed guide 54 is located at the second end of main bore 18 and is connected thereto by threads or the like in main bore channel 14.

Fixed guide or guide plug 54 is provided with a cavity 58 having a diameter slightly larger than the diameter of piston cushion guide member 52 and adapted to receive piston cushion guide member 52 therein. The spacing between the outside diameter piston guide member 52 and the inside diameter of cavity 58 is made large enough to allow hydraulic fluid contained in cavity 58 to escape as piston 40 moves away from first end 16 of bore 14, however, at a rate of deceleration to prevent hydraulic hammer which would result from the sudden closure of plug 28 slamming against valve seat 30. This clearance distance will, of course, depend upon the viscosity of the hydraulic fluid used to move piston 40 in bore 14 by applying hydraulic fluid pressure in second channel 50.

To prevent the flow of hydraulic fluid under pressure in second fluid channel 50 and bore 14 against piston 40 to force member 46 against plug 28, O-rings 60 are employed contained in a groove 62 girdling piston 40.

To operate the valve of the present invention, solenoid valve 24 can be energized to raise plug 28 away from seat 30, thus permitting the flow of fluid from inlet port 20, past element 46 of piston 40, through seat bracket 32, out through ports 32 and finally out of the valve through exit port 22.

When solenoid valve 24 is de-energized, plug 28, urged by spring 35, will again descend to seat 30 blocking the flow of fluid. To hydraulically override electric solenoid valve 24, an hydraulic fluid pressure is applied into second fluid channel 50, thus applying hydraulic pressure to piston 40 forcing it toward first end 16 of bore 14 to engage plug 28. The upper end of valve actuating member 44 will thereby lift plug 28 from valve seat 30 permitting the flow of fluid inlet port 20 and outlet port 22. At the same time, piston guide member 52 is withdrawn from cavity 58 in fixed guide or end plug 54 which sapced is then occupied by the hydraulic fluid under pressure in second channel 50 and bore 14 proximate second end 18. At the same time, bias spring 42 will be compressed thus applying a force against piston 40 in a direction toward second end 18.

As soon as hydraulic pressure is suddenly released from second fluid channel 50, the pressures applied to piston 40 by bias spring 42 and the bias against plug 28 by spring 35 in solenoid 24 will force piston 42 toward second end 18 of bore 14 also forcing piston guide member 52 into cavity 58. However, because of the narrow clearance between the inside diameter of cavity 58 and the outside diameter of piston guide member 52, the motion of piston 40 towards second end 18 will be decelerated due to the resistance to the flow of fluid caused by the viscosity of the fluid contained in cavity and the restricted flow rate because of the narrow clearance between the side of piston guide member 52 and the inside surface of cavity 58. This slowing of the rate of movement of plug 28 towards seat 30 thus prevents the sudden stopping of fluid flowing from inlet port 20 to outlet port 22 and thereby prevents excessively high transient pressures in inlet port 22 caused by the sudden deceleration of the fluid in the main fluid flow channel.

With reference to FIG. 2, there is illustrated an hydraulic and an electrical circuit diagram incorporating two of the by-pass pilot operated check valves of the present invention identified as valves 10 and 10'. The elements of valve 10 are identified with the same reference numerals a shown in FIG. 1. The elements of valve 10' are also identified with the same reference numerals as in FIG. 1 with the addition of the prime (') symbol to the reference numeral.

Although shown as two separate valves 10 and 10' in separate housings 12 and 12', the two valves 10 and 10' can be combined into a single housing with ports 20 and 20', and 50 and 50', respectively, combined into a single inlet and second fluid channel ports, respectively.

Circuit 100 of FIG. 2 incorporates two hydraulic cylinders 102 and 104 each cylinder being subjected to an independent load 106 and 108, respectively. It is the purpose of circuit 100 to allow loads 106 and 108 to be raised in unison, lowered in unison or lowered independently of each other.

Cylinder 102 comprises an "up" port 110 and a "down" port 112. "Up" port 110 is in fluid communication with outlet port 22 of valve 10. "Down" port 112 is in fluid communication through conduits 118 and 120 to "down" pump 122. "Down" port 112 is also in fluid communication through conduits 118 and 120 with second fluid channel 50 (through conduit 123) and 50' (through conduit 121), respectively, of valves 10 and 10'.

In a like manner, hydraulic cylinder 104 comprises an "up" port 130 and a "down" port 132. "Up" port 130 is in fluid communication through conduit 134 with outlet port 22' of valve 10'. "Down" port 132 is in fluid communication through conduits 136 and 120 to "down" pump 122. "Down" port 132 is also in fluid communication through conduits 136 and 120 with second fluid channel 50 (through conduit 123) and 50' (through conduit 121). Inlet port 20 is in fluid communication through conduits 138 and 140 with "up" pump 142. Inlet port 20' is in fluid communication through conduits 144 and 140 also with "up" pump 142. The inlet side 146 of "down" pump 122 is also in fluid communication through conduit 202 with piston 40 (through conduits 140 and 138) and the outlet side 150 of "up" pump 142. Also, the inlet side 152 of "up" pump 142 is in fluid communication with conduit 120 (through conduit 200) on the outlet side 154 of "down" pump 122. A solenoid valve 160 is connected in fluid communication between the inlet side 146 and the outlet side 154 of "down" pump 122.

While the hydraulic circuit is illustrated in FIG. 2 as a double line, the electrical circuit and connections between the various elements is shown in dashed line.

Again, with reference to FIG. 2, solenoid valve 24 of check valve 10 is connected at one side to ground or common 170 and at its other side to "down" switch 172 which, in turn, is connected to one side of relay coil 174. The other side of relay coil 174 is connected to one side of battery or current source 176 whose other side is connected back to ground or common 170.

In a like manner, one side of solenoid valve 24' of check valve 10' is connected to ground 170, while the other side of solenoid valve 24' is electrically connected through "down" switch or pushbutton 182 to one side of relay coil 184. The other side of relay coil 184 is connected to one side of battery 176, which, in turn, is connected to ground 170.

Contacts 190 and 192, respectively, actuated by relay coils 174 and 184, are both connected to one side of solenoid valve 160 whose other side is connected to ground or common 170. The other side of contacts 190 and 192 are connected to the power side of battery 176.

To simultaneously raise loads 106 and 108, "up" pump 142 is activated to cause fluid to flow out of outlet 150, through conduits 140, 144 and 138 to create a pressure against valve plugs 28 and 28' (FIG. 1) in sufficient magnitude to overcome the bias of springs 35 and 35' (FIG. 1). Thus fluid will flow out of outlet ports 22 and 22'. The flow of fluid through exit or outlet port 22 will pass through conduit 116 into "up" port 110 of hydraulic cylinder 102 and thus raise load 106. Simultaneously, fluid passing out of outlet port 22' will pass through conduit 130 into "up" port 134 of hydraulic cylinder 104 and thus raise load 108.

As fluid enters hydraulic cylinders 102 and 104, fluid will be displaced out of those hydraulic cylinders, respectively, through "down" ports 112 and 132, through conduits 118 and 136, respectively, into conduit 120, thence to conduit 200, back to inlet port 152 of "up" pump 142, thus completing the hydraulic circuit.

To simultaneously lower loads 106 and 108, "down" pump 122 is actuated to cause fluid to flow out of outlet port 154 into conduits 120, 121 and 123, causing a pressure to be applied to pistons 40 and 40'. As previously described, pistons 40 and 40' will be caused to engage, respectively, valve lugs 28 and 28' (FIG. 1) forcing solenoid valves 24 and 24' open. This will permit the flow of fluid out of "up" port 130 and "up" port 110, respectively, of hydraulic cylinders 104 and 102, while simultaneously introducing hydraulic fluid into "down" ports 112 and 132 of hydraulic cylinders 102 and 104, respectively. This will cause loads 106 and 108 to be lowered simultaneously. The fluid flowing from "up" port 110 will thus flow through conduits 116, through outlet port 22, past valve plug 28, inlet port 20, through conduits 138, 140 and 202 returning to inlet side 146 of "down" pump 122.

In a like manner, fluid will flow out of "up" port 130, through conduit 134, through outlet port 22', past valve plug 28', out inlet port 20' and through conduits 144, 140 and 202 returning through inlet side 146 of "down" pump 122, thus completing the hydraulic circuit.

As previously described, when "down" pump 122 is deactivated, solenoid valves 24 and 24' will thus close.

To individually lower loads 106 and 108, "up" pump 142 is actuated to raise loads 106 and 108 to their maximum height. Upon actuation of "down" pushbutton or switch 172, relay coil 174 is energized to cause contact 190 to close, thereby causing solenoid valve 160 to be energized by battery 176 to permit fluid to flow therethrough.

In this case, since solenoid valves 24 and 160 are open, fluid will be allowed to flow out of "up" port 110 of hydraulic cylinder 102 through conduit 116, through outlet port 22, past valve plug 28, through inlet port 20, through conduits 138, 140, 202 and 210, through solenoid valve 160, then through conduits 212, 120, and 118 and into "down" port 112 of hydraulic cylinder 102 thus completing the hydraulic circuit.

In the meanwhile, hydraulic cylinder 104 will remain in its up position because the hydraulic circuit which would permit the flow of fluid out of hydraulic cylinder 104 is closed so long as solenoid valve 25' remains closed.

In a like manner, it can be seen that actuation of "down" pushbutton 182 will cause solenoid valves 24' and 160 to open to create an hydraulic circuit permitting load 108 to be lowered by the flow of fluid out of "up" port 130 and into "down" port 132 through the hydraulic circuit illustrated.

I claim:

1. A valve comprising
means defining a housing,
means defining a main bore in said housing having a first end and a second end,
means defining an inlet port in fluid communication with said first end of said main bore,
means defining an outlet port in fluid communication with said first end of said main bore,
a solenoid valve having a valve plug and a valve seat disposed in said main bore between said inlet port and said outlet port, said plug of said solenoid valve biased against said seat of said solenoid valve when said solenoid valve is unenergized,
means defining a second fluid flow channel in fluid communication with said second end of said main bore,
a piston disposed in said main bore between said first and said second ends,
means for applying hydraulic fluid pressure in said second channel whereby said piston moves toward and engages said solenoid valve plug and moves said plug away from said seat to permit the flow of fluid from said inlet port to said outlet port, and
means for decelerating said piston when said piston moves away from said solenoid valve plug upon release of said hydraulic fluid pressure in said second channel.

2. A valve comprising
means defining a housing,
means defining a main fluid flow channel in said housing,
an electrically actuated solenoid valve comprising a valve actuating coil, a valve plug and a valve seat adapted to control the flow of fluid through said main fluid flow channel, said solenoid valve plug biased against said valve seat when said actuating coil is unenergized,
means defining a second fluid channel in said housing,
a piston adapted to slidably move in said second fluid channel in a direction coincident with the movement of said solenoid valve plug and in coaxial alignment with said valve plug and solenoid valve,
means for applying hydraulic fluid pressure to said piston whereby said piston engages said valve plug and moves said plug away from said valve seat to permit the flow of fluid through said main fluid flow channel, and
means for decelerating the motion of said piston when said piston moves away from said valve plug upon release of said hydraulic fluid pressure.

3. A valve comprising:
means defining a housing,
means defining a main bore in said housing having a first end and a second end,
means defining an inlet port in fluid communication with said first end of said main bore,
means defining an outlet port in fluid communication with said first end of said main bore,
a solenoid valve having a valve plug and a valve seat disposed in said main bore between said inlet port and said outlet port, said plug of said solenoid valve biased against said seat of said solenoid valve when said solenoid valve is unenergized,
means defining a second fluid flow channel in fluid communication with said second end of said main bore,
a piston disposed in said main bore between said first and said second ends, said piston comprising
a piston body,
a piston guide depending from said piston body into said second fluid channel, and
a fixed guide connected to said housing and having a diameter larger than the diameter of said piston guide, the spacing between said piston guide and said fixed guide adapted to control the rate of fluid flow from said fixed guide at a rate sufficient to decelerate the motion of said piston body, and
means for applying hydraulic fluid pressure in said second channel whereby said piston moves toward and engages said solenoid valve plug and moves said plug away from said seat to permit the flow of fluid from said inlet port to said outlet port.

4. A valve comprising means defining a housing, means defining a main bore in said housing having a first end and a second end, means defining an inlet port in fluid communication with said first end of said main bore, means defining an outlet port in fluid communication with said first end of said main bore, a solenoid valve having a valve plug and a valve seat disposed in said main bore between said inlet port and said outlet port, said plug of said solenoid valve biased against said seat of said solenoid valve when said solenoid valve is unenergized, means defining a second fluid flow channel in fluid communication with said second end of said main bore, a piston disposed in said main bore between said first and said second ends, said piston comprising a main body portion, a guide member depending from said body portion into said second fluid channel, and a valve actuator member having a diameter less than the diameter of said main body portion and extending into said main bore proximate said first end of said main bore, and means for applying hydraulic fluid pressure in said second channel whereby said piston moves toward and engages said solenoid valve plug and moves said plug away from said seat to permit the flow of fluid from said inlet port to said outlet port.

* * * * *